(12) United States Patent
Bocskai (10) Patent No.: US 12,456,934 B2
(45) Date of Patent: Oct. 28, 2025

(54) ADJUSTMENT DEVICE FOR LINEARLY MOVING A DRIVEN ELEMENT

(71) Applicant: PHYSIK INSTRUMENTE (PI) GMBH & CO. KG, Karlsruhe (DE)

(72) Inventor: Dominik Bocskai, Iffezheim (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 104 days.

(21) Appl. No.: 18/031,732

(22) PCT Filed: Oct. 13, 2021

(86) PCT No.: PCT/EP2021/078375
§ 371 (c)(1),
(2) Date: Apr. 13, 2023

(87) PCT Pub. No.: WO2022/079132
PCT Pub. Date: Apr. 21, 2022

(65) Prior Publication Data
US 2023/0387831 A1    Nov. 30, 2023

(30) Foreign Application Priority Data
Oct. 13, 2020   (DE) ............... 10 2020 126 863.7

(51) Int. Cl.
   *H02N 2/12*     (2006.01)
   *H02N 2/02*     (2006.01)
   *H02N 2/04*     (2006.01)

(52) U.S. Cl.
   CPC ............ *H02N 2/126* (2013.01); *H02N 2/02* (2013.01); *H02N 2/04* (2013.01)

(58) Field of Classification Search
   CPC ........... H02N 2/126; H02N 2/04; H02N 2/02; H02N 2/026; H02N 2/103; H02K 7/09; H02K 41/03
   See application file for complete search history.

(56) References Cited

U.S. PATENT DOCUMENTS

| 7,429,812 B2 | 9/2008 | Witteveen et al. |
| 8,912,707 B2 * | 12/2014 | Hwu .............. B82Y 35/00 310/328 |

(Continued)

FOREIGN PATENT DOCUMENTS

| DE | 102016108620 A1 | 11/2016 |
| DE | 102016104803 A1 | 8/2017 |

(Continued)

OTHER PUBLICATIONS

Written Opinion of the International Searching Authority (5 pages).
(Continued)

*Primary Examiner* — Emily P Pham
(74) *Attorney, Agent, or Firm* — The Juhasz Law Firm (57) ABSTRACT

The invention relates to an adjustment device, comprising: a stator; a driven element; a guide apparatus for bearing the driven element in a guided manner with respect to the stator in a drive direction when the adjustment device is operational; a slider; a bearing apparatus which bears the slider so as to be movable relative to the stator in the drive direction; a drive device which drives the slider; a coupling apparatus; and a clamping apparatus. When released, the clamping apparatus allows a range of movement between the connection device and either the slider or the driven element in order to set up an assembly state of the adjustment device and, when clamped, said clamping apparatus rigidly couples together the connection section and either the slider or the driven element in the drive direction and thereby allows a relative rotational movement between the driven element and the about a rotational axis extending in the drive direction.

24 Claims, 4 Drawing Sheets

(56) References Cited

U.S. PATENT DOCUMENTS 11,101,750 B2 8/2021 Marth et al.
2009/0243435 A1 10/2009 Schneider et al.

FOREIGN PATENT DOCUMENTS

| | | |
|---|---|---|
| DE | 112018000589 A1 | 11/2019 |
| DE | 112018000589 T5 | 11/2019 |
| EP | 3537592 A1 | 11/2019 |
| JP | 2008220171 A | 9/2008 |
| JP | 2009163017 A | 7/2009 |
| JP | 2009254228 A | 10/2009 |
| JP | 2014212682 A | 11/2014 |
| JP | 2016224143 A | 12/2016 |
| JP | 2019510457 A | 10/2021 |
| WO | WO2006000118 A2 | 12/2016 |
| WO | WO2017158017 A1 | 3/2017 |

OTHER PUBLICATIONS

ISR (2 pages).
Japanese language Written Opinion of the Japanese Patent Office dated Mar. 26, 2024 (5 pages).
Machine English translation of Japanese language Written Opinion of the Japanese Patent Office dated Mar. 26, 2024 (4 pages).

\* cited by examiner

ADJUSTMENT DEVICE FOR LINEARLY MOVING A DRIVEN ELEMENT

CLAIM TO PRIORITY

This application claims priority to and the benefit of the following pending application PCT/EP2021/078375 having an International filing date of 13 Oct. 2021 (13.10.2021) which claims priority to Priority Application No. DE 1O 2020 126 863.7 having a priority date of 13 Oct. 2020 (13.10.2020)

FIELD OF INVENTION

The invention relates to an adjustment device and to a method for the assembly thereof.

BACKGROUND

The applicant develops and sells linear and rotary adjustment devices, in which a slider is set in motion by means of a drive device which comes into frictional contact with the slider, wherein the rotor is on its part connected to a carriage or a platform on which a user can attach the element to be positioned by the adjustment device. In the case of such adjustment devices, it is advantageous if the rub or friction contact surface between the slider and the drive device already is from the beginning, i.e. before it comes to a mutual adaptation of the contact surfaces of the friction partners due to running-in effects, as large as possible and is temporally invariable in addition. As a result, larger and in particular more uniform driving forces can be transmitted to the slider, so that a simpler and more rapid regulation and also a higher accuracy of the adjustment device are possible.

In order to optimize the surfaces of slider and drive device provided for mutual contact in this respect, a high manufacturing effort is necessary. However, even if an ideal frictional contact can thereby be realized in the unmounted state, the assembly of the adjustment device generally results in a position or alignment which deviates from the ideal position or alignment of the slider and the drive device with respect to one another which is thus more unfavourable.

In order to avoid or mitigate the situation outlined above, it can be provided that the drive device or the slider, or else the bearing of the slider, is designed in such a way that a certain mobility, such as displaceability or tilting or pivotability, of drive device and/or slider is provided, which allows optimized mutual alignment of the contact surfaces. A preferred possibility for this is to design the bearing of the slider, which enables its guided movement in or along the drive direction, in such a way that a pivotability of the slider about an axis parallel to the drive direction is ensured. This can be realized, for example, by a bearing or a guide by which the slider is connected to a first linear guide rail, and by which a second linear guide rail cooperating therewith is connected to a stationary part or element of the adjustment device. Each of the linear guide rails comprises a V-groove in which rolling bodies are situated in the form of balls. The engagement ratios between the balls and the V-grooves thereby allow the desired rotational degree of freedom of the slider, so that an optimized alignment of the slider with respect to the drive device is ensured.

The above-described bearing of the slider to enable its optimized alignment with respect to the drive device, however, comprises the following disadvantage, inter alia: since the driven element implementing the adjustment movement, for example a carriage or a platform, is generally guided along the adjustment movement direction via a guide device, in particular in the case of high precision adjustment devices by a guide device and as the slider, for transmitting its movement caused by the drive device to the driven element is fixedly connected to the latter, already only slight tilting of the slider results in mechanical distortions of the adjustment device elements with respect to one another, which can have a negative effect on the operation or performance of the adjustment device. The mechanical stresses can, for example, lead to undesired forces being introduced into the guide device, which is disadvantageous in particular in the case of highly accurate guide devices and which adversely affect their accuracy or repeatability and which, moreover, can lead to increased wear.

The object of the invention is to provide an adjustment device which is implemented as an alternative to the known adjustment device.

In particular, it is an object of the invention to provide an adjustment device which overcomes the above-mentioned disadvantages of adjustment devices known from the prior art.

SUMMARY

This object is achieved in each case by an adjustment device according to claim 1 and by a corresponding method for assembly the adjustment device. The dependent claims referred to in each case in these claims each describe at least advantageous developments or improvements.

The adjustment device according to the invention comprises a stationary stator, a slider to be moved relative to the stator and supported by a support device, a drive device driving the slider, a driven element, for example in the form of a carriage or a platform, a guide device for the guided support of the driven element relative to the stator in a drive direction, and a coupling device. The coupling device comprises a connection element or connection section for a highly rigid connection of the driven element with the slider in particular in the drive direction, which, in the operational state of the adjustment device, allows at least one rotational relative movement between the driven element and the slider, in particular about an axis that runs parallel to the drive direction.

As a result of the connection of the slider to the driven element via the connection element or the connection section of the coupling device, which is highly rigid in the clamping state or in the operational state of the adjustment device in or along the drive or adjustment direction, a direct and play-free transmission of the movement of the slider to the driven element is achieved, while the rotational degree of freedom, which the connection section allows relative to the slider or to the driven element, ensures a mutual pivoting or tilting of the slider and the driven element, so that the driven element can be aligned independently of the orientation of the slider. Thus, the driven element can be fixedly connected to a guide device, for example two linear bearings arranged parallel to one another, which is arranged on the stator, without that the orientation of the driven element resulting from the connection has an effect on the orientation of the slider. In other words, the rotational degree of freedom allows an independent alignment or orientation of the slider and the driven element, so that an once realized optimized alignment between the slider and the drive device is not negatively influenced by the alignment or mounting of the driven element.

According to the invention, in particular an adjustment device is provided, which comprises: a stator (2), a driven element (6), a guide device (7) which, in the operational state of the adjustment device (1), provides a guided support of the driven element (6) with respect to the stator (2) in a drive direction, a slider (4), a support device (3) which movably supports the slider (4) relative to the stator (2) along the drive direction, a drive device (5) comprising a coupling device (8) and a clamping device (83), wherein the coupling device (8) comprises a connection device (80) which is fastened to the driven element (6) or the slider (4), wherein, in a release state, the clamping device (83) permits a movement clearance between a connection section (89) of the connection device (80) and either the slider (4) or the driven element (6) in order to establish a mounting state of the adjustment device (1) and wherein, in a clamping state, the clamping device (83) rigidly couples the connection section (89) and either the slider (4) or the driven element (6) in the drive direction, thereby causing a rotational relative movement about a rotational axis, which runs along the drive direction, between the driven element (6) and the slider (4).

In each of the embodiments of the adjustment device according to the invention described herein, in addition to or as substitute for functionally similar combinations of features, provision may be made that the connection device (80) comprises a base section (88), which is fastened to the driven element (6), and a connection section (89) which is connected to the base section (88) and that, in a release state, the clamping device (83) allows a clearance space between the connection section (89) and the slider (4) for establishing a mounting state of the adjustment device (1) and, in a clamping state, the clamping device (83) rigidly connects the connection section (89) and the slider (4) in the drive direction and thereby allows a rotational relative movement about a rotational axis, which runs along the drive direction, between the driven element (6) and the slider (4).

In these embodiments of the adjustment device according to the invention, it can be provided that the connection section (89) projects into a recess (40) of the slider (4), that the clamping device (83) is formed in or on the slider (4), that, in the release state, the clamping device (83) allows a movement clearance of the connection section (89) in the recess (40) of the slider (4), that, in the operational state of the adjustment device (1), the clamping device (83) presses the connection section (89) against a contact surface (40a) of the recess (40) of the slider (4) facing the clamping device (83) and thereby rigidly couples the slider (4) to the driven element (6) in the drive direction, wherein a rotational relative movement about a rotational axis, which runs along the drive direction, between the driven element (6) and the slider (4).

Thereby, it can be provided particularly that the connection section (809) comprises at least one spring-elastic section (82). This spring-elastic section (82) can be formed in one piece with the connection section (89).

In each of the embodiments of the adjustment device according to the invention described herein, in particular in which the base section (88) is fastened to the driven element (6), in addition to or as substitute for functionally similar combinations of features, provision can be made that the connection section (89) comprises a first support section (821a) on the side facing the clamping device (83), wherein a respective support element (81) is mounted in the first support section (821a) and wherein, in the clamping state, the clamping device (83) presses the support element against the connection section (89) and thereby allows a relative rotation between the respective support element and the clamping device (83).

In each of the embodiments of the adjustment device according to the invention described herein, in particular in which the base section (88) is fastened to the driven element (6), in addition to or as substitute for functionally similar combinations of features, provision can be made that the connection section (89) of the slider (4) comprises a second support section (822a) on the side facing away from the clamping device (83), wherein a respective support element (81) is supported in the second support section (822a), and wherein, in the clamping state, the clamping device (83) presses the connection section (89) against the second support element and the latter presses against the contact surface (40a) of the recess (40) and thereby permits a relative rotation between the respective support element and the connection section (89) of the slider (4).

In the embodiments of the adjustment device with a support section according to the invention, provision can be made, in particular, that the respective one of the support elements (81a, 81b) is designed as a support element which is spherically shaped at least in a section. In particular, it can be provided that the respective support section (821a, 822a) is designed in such a way that it acts in a self-centering manner with respect to the spherically shaped section of the support element (81).

In each of the embodiments of the adjustment device according to the invention described herein, in particular in which the base section (88) is fastened to the driven element (6), it can in particular be provided that the connection section (89) comprises two spring-elastic sections (821, 822) arranged opposite and spaced apart from one another and wherein a clamping element (84) is arranged in an intermediate space (82a) of the connection section (89) located between the two spring-elastic sections (821, 822), against which clamping element the two spring-elastic sections (82) are prestressed by means of the support elements (81) so that, in the operational state of the adjustment device (1), the clamping device (83) presses the spring-elastic sections (821, 822) with the clamping element (84) against the contact surface (40a) of the recess (40) of the slider (4) and thereby rigidly couples the slider (4) to the driven element (6) in the drive direction.

Particularly, it can be provided that the material of the clamping element (84) comprises a coefficient of thermal expansion which is different from the material of the connection element (80).

According to further embodiments of the adjustment device according to the invention, it can be provided that the base section (88) is attached to the driven element (6) or to the slider (4), wherein the clamping device (83) acts between the base section (88) and the connection section (89), wherein, in the release state, the clamping device (83) allows clearance between the base section (88) and the connection section (89), and in the clamping state, the connection section (89) protrudes from the base section (88) against a mounting part (85) of the slider (4) and the latter presses against the driven element (6).

In each of the embodiments of the adjustment device according to the invention described herein, in particular in which the base section (88) is fastened to the driven element (6) and the clamping device (83) acts between the base section (88) and the connection section (89), it can in particular be provided that the base section (88) and the connection section (89) are mounted resiliently against one each other in the drive direction. However, this can also be provided if the base section (88) is fastened to the slider (4).

In these embodiments, it can be provided in particular that the base section (88) and the connection section (89) form a solid-state body assembly comprising a solid-state hinge located between the base section (88) and the connection section (89).

In each of the embodiments of the adjustment device according to the invention described herein, in particular in which the base section (88) is fastened to the driven element (6) or to the slider (4) and the clamping device (83) acts between the base section (88) and the connection section (89), it can in particular be provided that a first support element (81*a*) is situated between the mounting part (85) of the slider (4) and the connection section (89), and wherein a second support element (81*b*) is situated between the mounting part (85) of the slider (4) and the driven element (6), so that, in the clamping state, the support elements (81*a*, 81*b*) form a pivot joint (90) for providing the rotational relative movement about an axis of rotation between the driven element (6) and the slider (4) extending along the drive direction.

In these embodiments, it can be provided in particular, for the respective one of the support elements (81*a*, 81*b*) to be formed in each case as a support element which is spherically shaped at least in a section.

In each of the embodiments of the adjustment device according to the invention described herein, in particular in which the base section (88) is fastened to the driven element (6) or to the slider (4) and the clamping device (83) acts between the base section (88) and the connection section (89), it can in particular be provided that the mounting part (85) of the slider (4) comprises a first support section (80*a*) on the side facing the clamping device (83), wherein a respective support element is mounted in the first support section, and wherein in the clamping state the clamping device (83) presses the first support element against the mounting part (85) and thereby allows a relative rotation between the respective support element and the clamping device (83).

In each of the embodiments of the adjustment device according to the invention described herein, in particular in which the base section (88) is fastened to the driven element (6) or to the slider (4) and the clamping device (83) acts between the base section (88) and the connection section (89), it can in particular be provided that the mounting part (85) of the slider (4) comprises a second support section on the side facing away from the clamping device (83), wherein a respective support element is mounted in the second support section, wherein, in the clamping state, the clamping device (83) presses the mounting part (85) against the second support element and the latter presses against the driven element (6) and thereby allows a relative rotation between the respective support element and the mounting part (85).

In these embodiments of the adjustment device according to the invention with at least one support section, it can be provided in particular that the respective support section (80*a*, 85*a*) is shaped in such a way that it acts in a self-centering manner with respect to the spherically shaped section of the support element (81)

In each of the embodiments of the adjustment device according to the invention described herein, in addition to or as substitute for functionally similar combinations of features, provision can be made for the stator (2), together with the driven element (6), forms a cavity within which the drive device (5) is arranged.

In each of the embodiments of the adjustment device according to the invention described herein, in addition to or as substitute for functionally similar combinations of features, provision can be made that the drive device (5) comprises an electromechanical element.

In each of the embodiments of the adjustment device according to the invention described herein, in addition to or as substitute for functionally similar combinations of features, provision can be made that the slider is situated between two drive devices (5) arranged opposite one another.

It may be advantageous, if the coupling device comprises at least one support element and preferably two support elements each of which are spherically shaped at least in a section. Due to the at least partially spherical shape of the support element or the support elements, each of which is preferably designed as a partial sphere or ball, a bearing with a rotational degree of freedom can be achieved in a simple manner. In particular, a support element designed as a ball is available in many sizes, qualities and materials in a simple and comparatively cost-effective manner. In addition, a spherical support element does not have to be aligned. Due to the spherically shaped support element, it is also possible, by means of a point contact to an element or part of the adjustment device supporting the support element, to avoid or significantly reduce interfering force components which particularly have directions deviating from the drive or adjustment direction.

It can also be advantageous, if the connection element comprises at least one support section which is provided for receiving or mounting a support element. In this case, it may in particular be advantageous, if the support section is shaped in such a way that it acts in a self-centering manner with respect to the spherically shaped section of the support element. This allows an extremely simple assembly of the adjustment device, since the support element aligns or positions in contact with the support section and in particular during pressing against the support section itself and without further measures. The centering makes it possible to avoid undesired contacts of the support elements with other elements or parts of the adjustment device, which can lead to undesired force transmissions. Furthermore, the centering generally effects a circular and thus large-area contact than in the case of a point contact which comprises a higher stiffness.

It may likewise be advantageous if the connection device comprises at least one spring-elastic section. The spring-elastic section of the connection device allows in a simple manner to compensate for dimensional tolerances, for example due to manufacturing or assembly inaccuracies and/or thermal expansion. In this case, in particular, it may be advantageous, if each spring-elastic portion is formed in one piece or integrally with the connection device. As a result of the reduction of the number of individual parts, this allows particularly simple assembly of the adjustment device. In addition, the one-piece connection of the spring-elastic sections with the connection device or the base section thereof results in a solid-state hinge, which in principle comprises no wear and only a low internal friction.

Furthermore, it can be advantageous if at least one support element is pressed directly or indirectly against the support section with the aid of a clamping device. As a result, it is possible in a simple manner to move or press the corresponding support element against the support section with a defined force.

It can be advantageous if the support section is formed in the spring-elastic section. As a result, an integral solution for forming the support section is achieved, and by the correspondingly reduced number of parts of the adjustment device, a faster and simpler assembly is achieved.

It may likewise be advantageous if the connection device or the connection section comprises two spring-elastic sections arranged opposite and spaced apart from one another and if a clamping element is arranged in an intermediate space of the connection element located between the two spring-elastic sections, against which clamping element the spring-elastic sections are pretensioned by means of the support elements. By means of the two spring-elastic sections arranged opposite one another and spaced apart from one another, a symmetrical arrangement is provided, which in particular ensures identical conditions along the arrangement direction of the spring-elastic sections, which is preferably arranged parallel to the drive or adjustment direction. In this context, the term "spring-elastic" means that the corresponding sections are designed in such a way that they can be reversibly deformed or deflected like a spring, wherein a corresponding restoring force is caused by the deformation or deflection, which attempts to move the spring-elastic sections back into the undeflected orientation or position. Due to the fact that the spring-elastic sections can be supported on the clamping element, an extremely stiff connection or coupling between the slider and the driven element is provided with a corresponding contact which corresponds to a prestress on the block.

In this case, it may in particular be advantageous if the material of the clamping element comprises a thermal coefficient of expansion which is different from the material of the connection element. As a result, gaps (play) which may otherwise occur between the clamping element and the spring-elastic sections of the connection section, which counteract a desired gap-free or play-free bearing, can be avoided.

It may prove advantageous if the coupling device or the slider comprises, in addition to the connection section, a separate mounting element or a separate mounting part for connecting the slider to the support device, wherein a support section is formed in the connection element and a support section is formed in the mounting section or the mounting part. In this case, it may prove to be particularly advantageous if the connection device comprises a solid-state arrangement with a clamping part or connection section guided in parallel, and the clamping device enables tension between the spring-elastic section and the clamping part. This makes it possible to realize a direction of the prestressing force which is arranged substantially parallel to the drive direction.

It may also prove advantageous if the stator forms a cavity together with the driven element, within which cavity the drive device is arranged. As a result, an extremely compact drive is achieved, wherein the compactness can be further increased in that electronic parts or components for controlling or regulating the adjustment device are also arranged within the cavity. These include, for example, sensors, controllers or drivers.

Furthermore, it may prove advantageous if the drive device comprises an electromechanical element. Electromechanical elements exhibit dimensional changes under the influence of an electrical voltage or electric field, which are usable for driving the slider and thus of the driven element. These include, for example, elements of piezoelectric or electrostrictive materials which experience approximately a change in length in the case of electrical voltages applied to them.

Furthermore, it may prove advantageous if the support device itself is formed by a drive device, wherein the slider is situated between two drive devices arranged opposite one another. As a result, the driving force of the adjustment device can be increased.

Furthermore, it is provided according to the invention that the support device, at least in the clamping state or operational state, supports the slider in such a way that it comprises a rotational degree of freedom about an axis of rotation which is arranged substantially parallel to the drive direction. The term "substantially" here means that certain deviations from the ideally parallel arrangement between the axis of rotation and the drive direction are possible without resulting in a significant change and in particular deterioration. In particular, these should be understood to mean deviations of +/−5° from parallelism. By virtue of the rotational degree of freedom, a mutual optimized alignment between the slider and the drive device can be realized in a simple manner, wherein a tilting or pivoting of the slider relative to the drive device is caused, for example, by pressing the slider and the drive device against each other.

A method for assembling the above-described adjustment device comprises the following steps, which are preferably to be carried out successively and in accordance with ascending numbering: Step: mounting the support device or a part of the support device and the guide device to the stator; Step: connecting the slider to the support device or to a part of the support device; Step: mutual alignment of the slider and the drive device; Step: mounting the drive device to the stator; Step: mounting the driven element to the guide device; Step: connecting the driven element to the slider by means of the coupling device.

Such an assembly method permits the mutual fixed connection of the slider and the driven element only in the last assembly step, so that a free displacement of the driven element, which is independent of the drive device, is possible beforehand. In this way, without coupling with the drive device, a check or alignment of the adjustment device with respect to its guidance accuracy and guide quality can be carried out over the entire actuating path or stroke is performed, and the coupling to the slider is performed only with the last assembly step, wherein this coupling does not have a negative effect on the optimized alignment of the slider to the drive device carried out in a preceding assembly step.

DESCRIPTION OF DRAWINGS

Embodiments of the invention are described below with reference to figures, which show.

DETAILED DESCRIPTION

Figure 1:
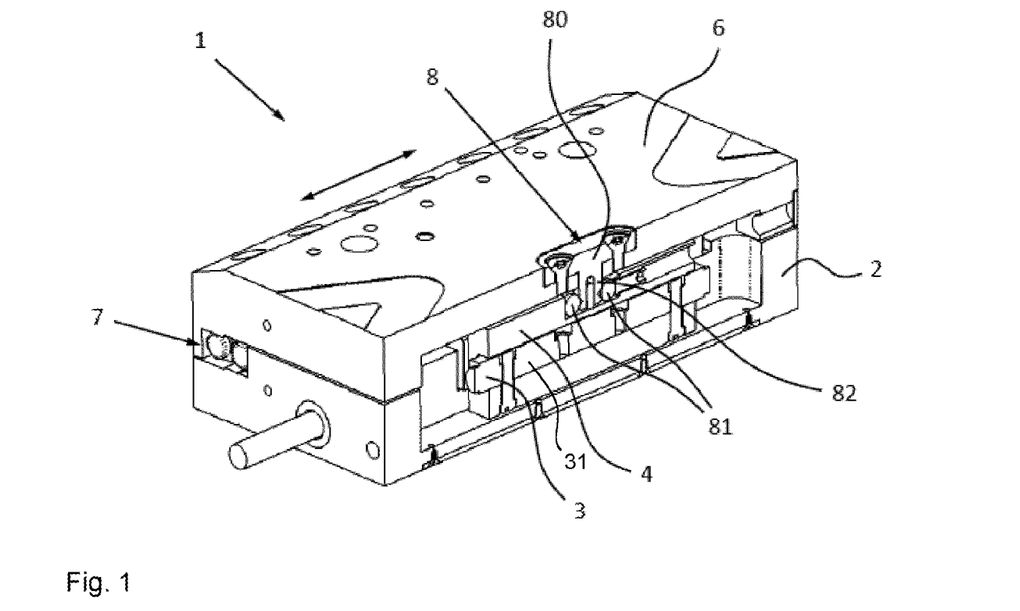
FIG. 1 is a perspective sectional view of an adjustment device according to the invention.

FIG. 1 shows a perspective view of the section through an embodiment of the adjustment device 1 according to the invention in the form of a linear table. The same comprises a stator 2, with respect to which the driven element 6 in the form of a table or carriage can be moved linearly in or along an adjustment direction (characterized by a corresponding double arrow in FIG. 1), wherein a defined and in particular highly precise adjustment or positioning of the table or of the carriage is intended. For this purpose, the table or carriage is connected to the stator 2 via a guide device 7 in the form of two linear bearings arranged parallel to one another and is thereby mounted in a linearly movable manner. A drive device is used to drive the table or carriage in or along the adjustment direction, wherein the drive device is disposed within the adjustment device and is not recognizable in FIG. 1 and wherein the drive device is fixedly connected to the stator 2 and is or comes in frictional contact with an elongated slider 4. The slider 4 is in turn linearly supported or guided along a drive direction by means of a support device 3, wherein the drive direction substantially coincides with the adjustment direction. In the illustrated embodiments, the support device 3 is formed from a first linear guide rail 31, which is fixed to the slider 4, and a second linear guide rail 32, which is fixed to the stator 2, wherein, in the operational state, the linear guide rails 31, 32 can move along each other, when the slider 4 is actuated.

The adjustment device 1 comprises a coupling device 8 with a connection device 80 and a clamping device 83 for the rigid coupling of the slider 4 and the driven element 6 in the drive direction by means of a clamping device 83 in a clamping state, wherein a rotational relative movement about a rotational axis running along the drive direction between the driven element 6 and the slider 4 is permitted as a degree of freedom of this coupling. For this purpose, the coupling device 8 or connection device 80 comprises a base section 88 and a connection section 89, which can be formed together as one piece (FIGS. 1 to 7) or as parts which are separate from one another and fastened to one another. Furthermore, in a release state, the clamping device 83 allows a movement clearance between the connection section 89 and either the slider 4 or the driven element 6 in order to establish an assembly state of the adjustment device 1.

In the illustrations of FIGS. 1 to 7, the connection device 80 comprises a base section 88 which is attached to the driven element 6 and a connection section 89 which is connected to the base section 88. Thereby, in a release state, the clamping device 83 allows a movement clearance between the connection section 89 and the slider 4 in order to establish a mounting state of the adjustment device 1 and, in a clamping state, rigidly couples the connection section 89 and the slider 4 in the drive direction, thereby allowing a rotational relative movement about an axis of rotation extending along the drive direction between the driven element 6 and the slider 4.

Alternatively, in other implementations not shown in FIGS. 1 to 7, the base section 88 may be attached to the slider 4 and the connection section 89 which is connected to the base section 88 may interact mechanically with the driven element 6 in a release state, that the clamping device 83 permits a movement clearance between the connection section 89 and the driven element 6 in order to establish a mounting state of the adjustment device 1 and, in a clamping state, rigidly couples the connection section 89 and the driven element 6 in the drive direction and thereby permits a rotational relative movement about an axis of rotation extending along the drive direction between the driven element 6 and the slider 4. In this case, in particular, the clamping device can be arranged or fastened in or on the driven element 6.

As shown in the figures, the clamping device 83 can generally be realized by an actuating part, such as a screw or a bolt, which in an opening or bore of the slider 4 or of the driven element 6 can be movable or adjustable in positions between the release state, in which there is play or distance between the actuating part and the connection section 89, and the clamping state in which the actuating part presses on the connection section 89.

Thus, via the connection device 80, the slider 4 can be rigidly coupled to the driven element 6 in the drive direction, wherein the coupling device 8 can ensure, at least in or along the drive direction or the adjustment direction, in particular a highly rigid coupling between the slider 4 and the driven element 6. In the illustrations of FIGS. 1 to 7, the connection section 89 of the connection element 80 is fixedly connected to the driven element 6 by means of screws.

In the embodiment of FIGS. 1 to 7, the connection section 89 is formed by two spring-elastic sections 82 or 821, 822, which project into a recess 40 of the slider 4, wherein support elements 81 or 821a or 822a each in the form of balls are respectively arranged between the spring-elastic sections 82 and the surfaces which delimit the recess 40 of the slider 4 in or along the drive or adjustment direction. As an alternative to this, the connection section 89 can be designed as only single spring-elastic section 82 can be realized. In general, the adjustment device 1 can also be designed without support elements.

Figure 2:
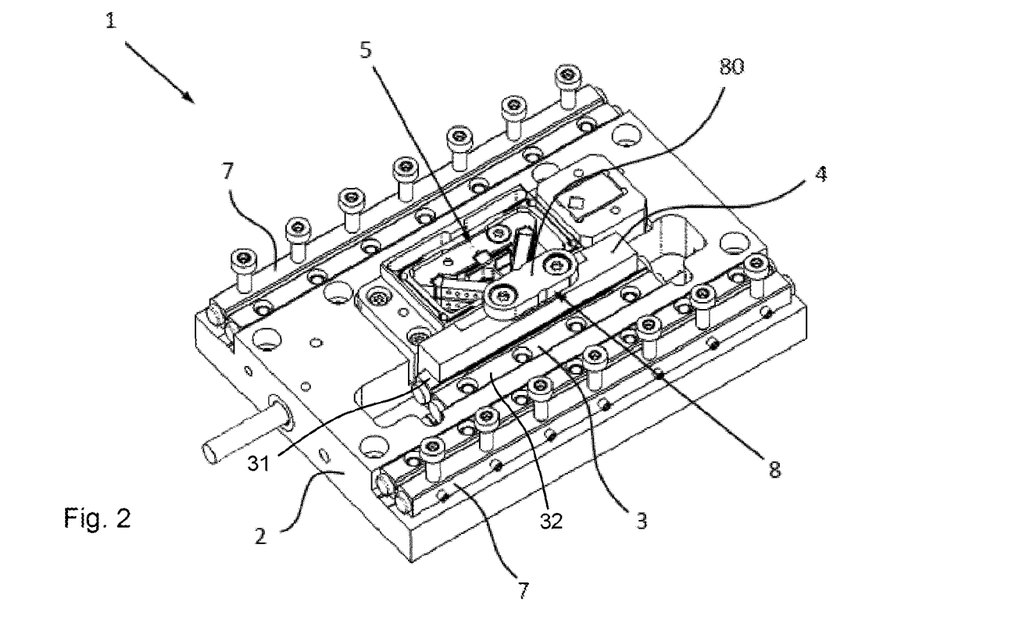
FIG. 2 is a perspective view of the adjustment device according to FIG. 1 with the driven element removed.

FIG. 2 shows the adjustment device 1 according to FIG. 1 in a perspective and uncut representation from above with the driven element removed. On the basis of this illustration, the two linear guides of the guide device 7 can be seen as well as the support device 3 for mounting or guiding the slider 4. In this case, the slider 4 comprises a groove-shaped recess in which a section of the linearly movable part of the support device 3 is accommodated. Furthermore, the drive device 5, which comprises V-shaped and columnar piezoelectric elements arranged in pairs in a V-shape, wherein a friction element which cannot be seen in FIG. 2 is arranged at the ends of a pair of piezoelectric elements which taper towards one another, which friction element is provided for frictional contact with the slider 4 or with a friction layer arranged on the slider 4 or with a friction element arranged on the slider 4.

Figure 3:
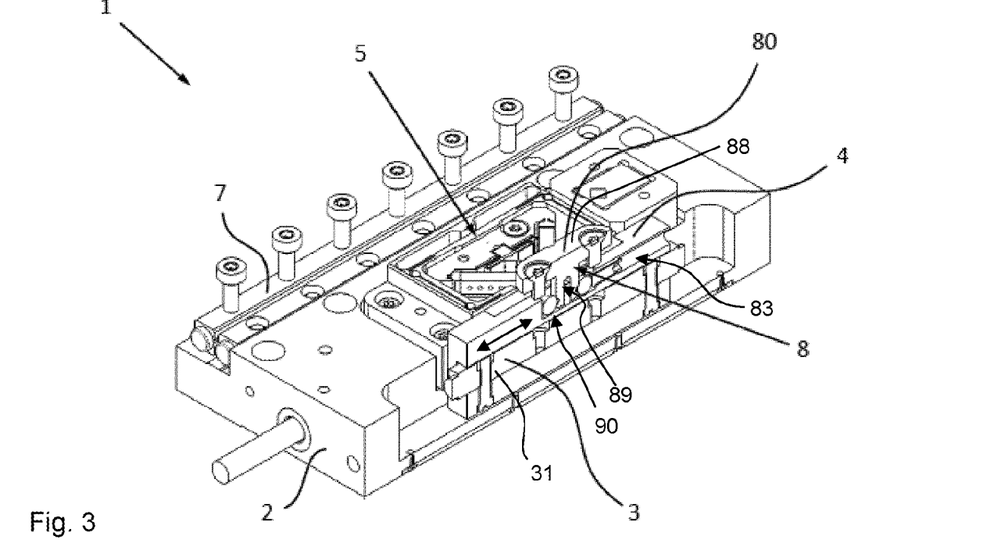
FIG. 3 is a sectional view of the adjustment device according to FIG. 2, FIG. 4: enlarged section from the sectional view according to FIG. 3.

FIG. 3 shows in particular further details of the adjustment device 1 according to FIGS. 1 to 5 for arranging the slider 4 on the support device 3 on the basis of a section which is defined parallel to the guide device 7 with respect to the illustration of FIG. 2.

Figure 4:
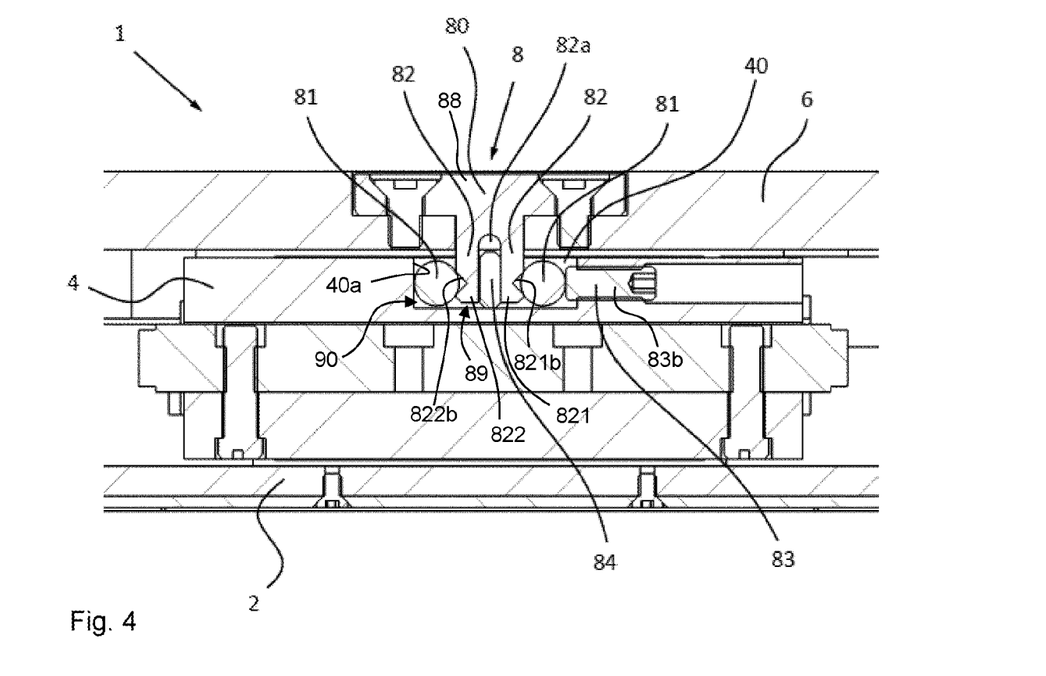
Figure 5:
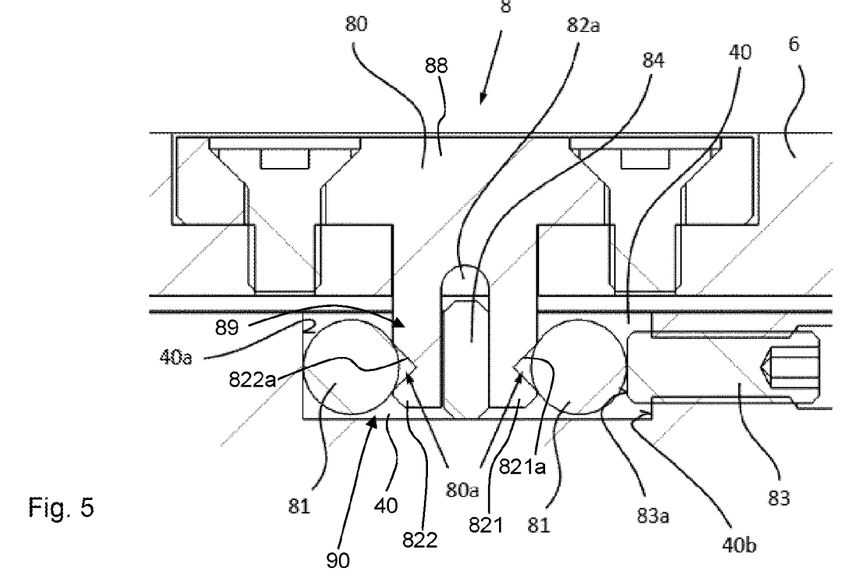
FIG. 5 shows an enlarged detail from the sectional view according to FIG. 4, FIG. 6: a sectional view of a region of an adjustment device according to the invention with a further embodiment of the coupling device.

FIG. 4 shows an enlarged detail of the section according to FIG. 3 around the region of the coupling device 8, while FIG. 5 represents an enlarged detail in this regard. The connection device which is designed as an one-piece connection element, comprises a T-like shape in cross section, wherein the leg arranged horizontally in the viewing direction on the illustration, that is to say the base section 88a realizes a fixed connection of the same to the driven element 6 by means of a screw connection, while the connection section 88 of the connection device 80, which, when viewed in the viewing direction, extends perpendicularly to the latter, comprises the two spring-elastic sections 82 or 821, 822 which are configured in one piece or integrally with the latter and are arranged opposite and at a distance from one another one another with respect to the drive direction or adjustment direction, which sections are partially inserted into the recess which is formed in the slider 4. A clamping element 84, which is in contact with the spring-elastic sections 821, 822, is situated in an intermediate space 82a, which is situated between the two spring-elastic sections 82 which are spaced apart from one another and is delimited by the latter in the drive direction. On each side of the respective spring-elastic section 82 or 821, 822 facing away from the clamping element 84, a recess which is V-shaped in cross section is formed in the respective spring-elastic section 82 or 821, 822, which recess forms a support section 80*a* or 821*a* or 822*a* for receiving the respectively associated support element 81, in particular in the form of a sphere (FIG. 4) or hemisphere. The respective support section 80*a* comprises a conical shape, so that the support element 81 or a spherical surface thereof is supported on the support section 80*a* via an annular surface contact.

The conical shape of the respective support section 80*a*, in interaction with a spherical surface area of the support elements 81, ensures self-centering of the support elements 81 when pressing or pressing a support element 81 against the corresponding support section 80*a*. In this way, it can be provided that, solely by the pressing or pushing the support elements 81 against the support sections 80*a*, a lifting off of the support sections 80*a* takes place from the bottom of the recess 40 within the slider 4. In the case of a spherical design of the support elements 81, these can be supported on the side of the recess or actuating part of the clamping device 83 via a point contact on a flat surface on a side which faces away from the spring-elastic section 82 and on the support section 80*a* via an annular surface contact. The planar support surface for the support element 81 on the left side in FIG. 4 or FIG. 5 in the viewing direction is formed by a side wall 40*a* of the recess 40, while the planar support surface for support element 81 on the right side in FIG. 4 or FIG. 5 is formed by the flat surface 83*a* of the actuating part 83*b* of the clamping device 83*b*. Thus, no undesired forces with a direction which deviates from the drive direction or from the adjustment direction are transmitted. In addition, this type of mounting or supporting of the support elements ensures the desired rotational degree of freedom, which allows mutual tilting or pivoting between the slider 4 and the coupling device 8 or the driven element 6 connected thereto.

The pressing or pushing of the support elements 81 against the support sections 80*a* or 821*a* or 822*a* formed in the resilient sections 82 is realized by means of the clamping device 83 with the actuating part 83*b*, in particular as shown in the form of a screw, the flat end face of which engages, when viewed in the viewing direction onto the presentations of FIG. 4 or FIG. 5, the right support element 81 and presses the latter on the basis of a corresponding clamping force in a direction onto the associated spring-elastic section 82. As a result, with regard to the presentations of FIG. 4 or FIG. 5, the right support element 81 presses on the associated and, with regard to the presentations of FIG. 4 or FIG. 5, right spring-elastic section 82 and deflects the same in the corresponding direction, i.e. to the left. Thereby, with regard to the presentations of FIG. 4 or FIG. 5, the right spring-elastic section 82 gets in contact with the clamping element 84 or presses against it, so that the same, with regard to the presentations of FIG. 4 or FIG. 5, gets into contact with the left spring-elastic section 82 in FIG. 4 or FIG. 5, and transmits the clamping force caused by the clamping device 83 to the spring-elastic section 82. Since, when viewed in the viewing direction onto the presentations of FIG. 4 or FIG. 5, between the left spring-elastic section 82 and the slider 4 a support element 81 is arranged, the support element 81 is clamped between the side wall 40*a* and this spring-elastic section on account of the clamping force, and, when viewed in the viewing direction onto the presentations of FIG. 4 or FIG. 5, the corresponding counterforce ensures a contact of the left spring-elastic section 82 on the clamping element 84 in FIG. 4 or FIG. 5. Thus, both spring-elastic sections 82 are in contact both with the clamping element 84 and with the respective support element 81, which results in a rigid coupling of the coupling device 8 or of the driven element 6 fixedly connected thereto to the slider 4.

The at least one section 82 does not have to be spring-elastic in each case, but can also be implemented rigidly.

For the corresponding assembly, the support elements 81 are first inserted into the recess in such a way that they are located in the vicinity of the two side walls 40*a*, 40*b* of the recess of the slider 4. The driven element 6 is then displaced along the drive or adjustment device until the recess thereof serves to receive the connection device 80 or the connection section 89 in the region of the recess 40 of the slider 4. The connection section 89 is then inserted together with the clamping element 84, which is inserted between the two spring-elastic sections 82 and in the intermediate space 82*a*, into the recess of the driven element 6 in such a way that the elastic spring sections 82 are arranged between the two support elements 81. This is made possible or facilitated by the driven element 6 being freely slidable or movable along the adjustment direction. In the further sequence, the connection section 89 and thus the connection device 80 are connected to the driven element 6 by screwing. Finally, the actuating part or the screw of the clamping device 83 is tightened and brought into the clamping state, so that the planar clamping device surface 83*a* comes into contact with the right support element 81, when viewed in the viewing direction onto the presentations of FIG. 4 or FIG. 5, and, when the screw is further tightened, a clamping force is exerted, which clamps the support elements 81, the spring-elastic sections 82 and the clamping element 84 against one another, wherein these are respectively in contact with each other, so that a contact is realized on the block, which ensures a very stiff coupling of the slider 4 and the driven element 6 into or along the driving or adjustment direction, while at the same time a rotational degree of freedom is provided for mutual tilting or pivoting of the slider and the driven element. In contrast to the sequence of assembly steps outlined above, it is possible first to tighten the screw of the clamping device 83, and only then to implement the connection of the driven element 6 and the connection section 89 or the connection device 80.

In the embodiments described with reference to FIGS. 1 to 7, the connection section 89 generally projects into a recess 40 of the slider 4, wherein the clamping device 83 is formed in or on the slider 4. In the release state, the clamping device 83 also generally allows a movement clearance of the connection section 89 in the recess 40 of the slider 4, wherein, in the operational state of the adjustment device 1, the clamping device 83 presses the connection section 89 against a contact surface 40*a* of the recess 40 of the slider 4, which faces the clamping device 83, and thereby rigidly couples the slider 4 in the drive direction to the driven element 6, wherein a rotational relative movement about an axis of rotation running along the drive direction is allowed between the driven element 6 and the slider 4.

Figure 6:
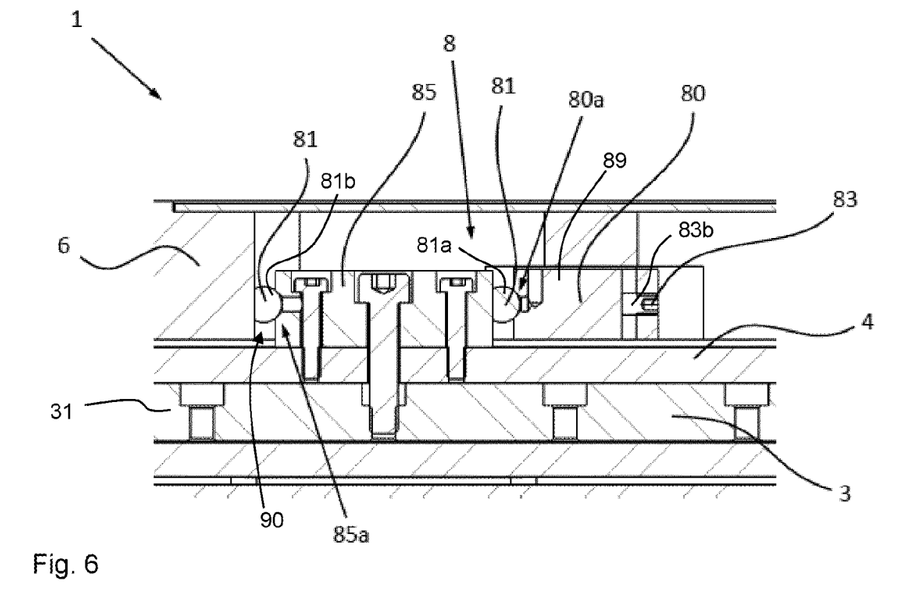

FIG. 6 shows a further embodiment of the adjustment device according to the invention with a coupling device 8 designed differently from FIGS. 1 to 5, which comprises, in addition to the connection device 80, a separately realized mounting part 85, which is fastened to the slider 4 and can thus be regarded as part of the slider 4. The mounting part 85 and the slider 4 can also be realized together as one piece, that is to say as an one-piece slider 4.

Figure 7:
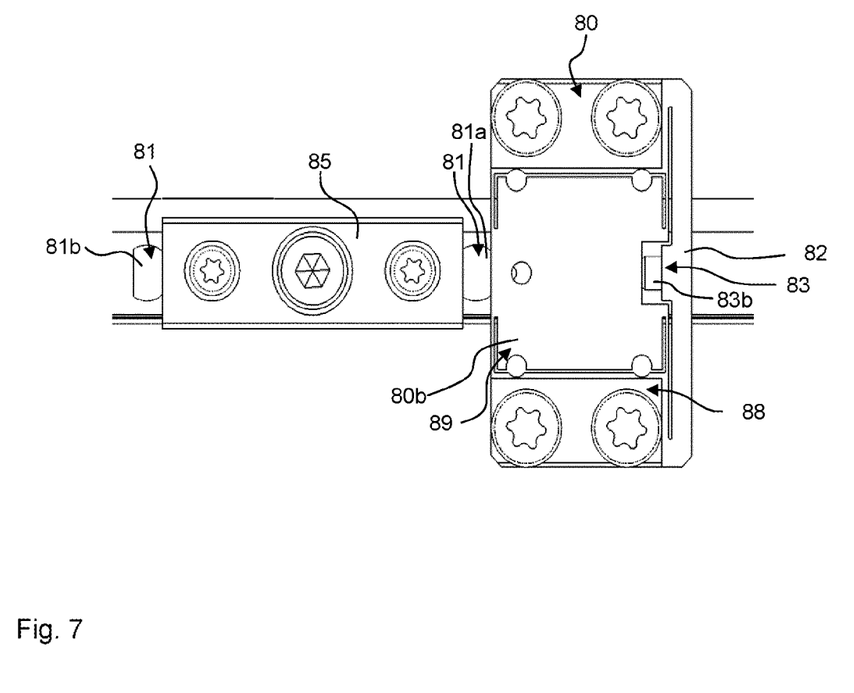
FIG. 7: plan view from above of a further embodiment of a coupling device of an adjustment device according to the invention, which corresponds functionally to the adjustment device shown in FIG. 6.

In the embodiments described herein with reference to FIGS. 6 and 7, it is generally provided that the base section 88 is attached to the driven element 6 or to the slider 4. In the embodiments of the adjustment device 1 shown in FIGS. 6 and 7, the base section 88 is fastened to the driven element 6. In each of these embodiments, the clamping device 83 acts between the base section 88 and the connection section 89, wherein in the release state the clamping device 83 permits a movement clearance between the base section 88 and the connection section 89 and, in the clamping state, presses the connection section 89 from the base section 88 against a mounting part 85 of the slider 4 and the latter against the driven element 6. In alternative implementations, the base section 88 can also be fastened to the slider 4 and the further components can be realized in an analogous manner.

In the embodiments of FIGS. 6 and 7, the base section 88 and the connection section 89 are mounted resiliently against each other in the drive direction.

Specifically, in the embodiment of FIG. 6, on the one hand, a support element 81 (which, when viewed in the viewing direction onto the presentation of FIG. 6, is the right support element) is arranged between the connection device 80 and in particular the connection section 89 thereof and the mounting part 85, and, on the other hand, a support element 81 (which, when viewed in the viewing direction onto the presentation of FIG. 6, is the left support element) is arranged between the mounting part 85 and an inner wall surface of the driven element 6. Such an embodiment of the coupling device 8 is not as compact as that according to FIGS. 1 to 5, but this can provide mounting technical advantages. In particular, a simpler accessibility of the spring-elastic section can thus be realized. When support elements, which deviate from a spherical shape, for example when ground and thus flattened balls are used, a simpler alignment of the support elements is possible by such an embodiment of the coupling device.

The mounting part 85 of the coupling device 8 is essentially rigid and serves, in particular, for the connection between the slider 4 and the support device 3. When viewed in the viewing direction onto the presentation of FIG. 6, on the left side of the mounting part 85, a support element 81 with its spherical section bears against the support section 85*a* of the mounting part 85 which causes a self-centering, while the flattened section of the support element 81 is supported on a flat surface of the driven element 6. The mounting part 85 is connected, on the one hand, to the slider 4 and, on the other hand, to the support device 3 by means of screws. When viewed in the viewing direction onto the presentation of FIG. 6, on the right side of the mounting part 85 the other support element 81 with its complementarily shaped flattened portion rests against the flat side surface located there. The spherical section of the mounting part 81, which is right one when viewed in the viewing direction onto the presentation of FIG. 6, is supported on the support section 80*a* of the connection element 80 which is shaped complementarily and causes a self-centering. The connection element 80 is connected to the slider 4 and to the driven element 6.

FIG. 7 illustrates, in a plan view from above, the construction of the connection device 80 of FIG. 6, which is formed from the base section (88) and the connection section 89, wherein the base section 88 and the connection section 89 are movable relative to one another, in particular against the action of a spring device, here in the form of solid-state hinges, which are arranged between the base section 88 and the connection section 89. The connection section 89 is designed as a clamping part 80*b*, which is connected via solid-state hinges to the remaining part of the connection element 80, that is to say the base section 88. The solid-state hinges are designed in such a way that, in the event of an exertion of a clamping force by means of the clamping device 83, said clamping force acts substantially in or along the drive or adjustment direction. The clamping device 83 here comprises an actuating part in the form of a screw, which is screwed into a thread formed in the base section 88, here in the form of a spring-elastic section 82 of the connection device 80, and presses with its screw end face against the clamping part so that the clamping part 80*b* is pressed in the direction of the mounting part 85. On the side of the clamping part 80*b* which is arranged opposite the clamping device 83, the left support element 81, when viewed in the viewing direction onto the presentation of FIG. 7, bears with its spherically formed section on the support section 80*a* and presses in the direction to the mounting part 85 so that it is pressed in the direction of the other support element 81, which in turn is supported with the flattened side on an inner wall surface of the driven element 6 (in FIG. 7 not visible) and at the same time its spherically formed section is supported by means of the complementarily shaped support section 85*a*. Thus, the connection element 80 or its clamping part 80*b*, the support elements 81 and the mounting part 85 are braced or pressed against one another and a contact is realized on block, which ensures a rigid coupling between the slider 4 and the driven element 6 in the drive direction or adjustment direction. However, in the realization of the adjustment device according to FIG. 6, the rigidity along the driving direction or adjustment direction is greater to the left than to the right, since the comparatively high elasticity of the spring-elastic section 82 becomes noticeable in the case of a drive or an adjustment to the right. In a corresponding manner, in FIG. 7, in the case of a drive or an adjustment to the right, the stiffness of the coupling is higher than in the case of a drive or an adjustment to the left.

Generally in the embodiments illustrated in FIGS. 6 and 7, as options, a first support element 81*a* is located between the mounting part 85 of the slider 4 and the connection section 89, and a second support element 81*b* is situated between the mounting part 85 of the slider 4 and the driven element 6, so that, in the clamping state, the support elements 81*a*, 81*b* form a pivot joint 90 for providing the rotational relative movement between the driven element 6 and the slider 4 about an axis of rotation extending along the drive direction. Alternatively, these embodiments comprise only one of the support elements 81*a*, 81*b* or none of the support elements 81*a*, 81*b*, so that in the clamping state the actuating part 83*b* presses directly on the connection section 89, as a result of which the latter is pressed directly onto the mounting part 85 and this is in turn pressed directly onto the driven element 6.

Furthermore, in these embodiments, as options, the respective one of the support elements 81*a*, 81*b* is in each case formed as a support element which is spherically shaped at least in a section.

Furthermore, in these embodiments, the mounting part 85 of the slider 4 on the side facing the clamping device 83 comprises a first support section 80*a*, wherein a respective support element is supported on the first support section, and wherein, in the clamping state, the clamping device 83 presses the first support element against the mounting part 85 and thereby allows a relative rotation between the respective support element and the clamping device 83.

Furthermore, in these embodiments, as options, the mounting part 85 of the slider 4 comprises a second support section on the side facing away from the clamping device 83, wherein a respective support element is mounted in the second support section 85*a*, and wherein, in the clamping state, the clamping device (83) presses the mounting part 85 against the second support element and the latter against the driven element 6 and in so doing allows a relative rotation between the respective support element and the mounting part 85.

In particular, the respective support section 80*a*, 85*a* can be shaped in such a way that it acts in a self-centering manner with respect to the spherically shaped section of the support element 81.

Although adjustment devices with a linear adjustment path are always shown in the figures, the invention is not restricted to linear adjustment devices; also rotary devices or rotary adjustment devices are conceivable in which the rotor executes a rotation or a rotation as an adjustment movement.

LIST OF REFERENCE SIGNS 1 adjustment device
2 stator
3 support device
4 slider
5 drive device
6 driven element
7 guide device
8 coupling device
40 recess (of the slider 4)
40*a* side wall (the recess 40)
40*b* side wall (the recess 40)
80 Connection device (the coupling device 8)
821*a*, 822*a* support section (the connection device 80)
80*b* clamping part (of the connection element 80)
81 support element (the coupling device 8)
82, 821, 822 spring-elastic section (the coupling device 8)
82 gap
83 clamping device (the coupling device 8)
83*a* clamping device surface
83*b* actuating part
84 clamping element (the coupling device)
85 mounting part for rigid coupling
85*a* a mounting section (of the mounting part)
88 base section
89 connection section
90 pivot joint

What is claimed is:

1. An adjustment device which comprises a stator, a driven element, a guide device which, in the operational state of the adjustment device, provides a guided support of the driven element with respect to the stator in a drive direction, a slider, a support device which movably supports the slider relative to the stator along the drive direction, a drive device comprising a coupling device and a clamping device;
   wherein the coupling device comprises a connection device which is fastened to the driven element or the slider; and
   wherein, in a release state, the clamping device permits a movement clearance between a connection section of the connection device and either the slider or the driven element in order to establish a mounting state of the adjustment device and wherein, in a clamping state, the clamping device rigidly couples the connection section and either the slider or the driven element in the drive direction, thereby causing a rotational relative movement about a rotational axis, which runs along the drive direction, between the driven element and the slider.

2. The adjustment device according to claim 1,
   wherein the connection device comprises a base section which is attached to the driven element and connected to the connection section; and
   wherein, in a release state, the clamping device allows a clearance space between the connection section and the slider for establishing a mounting state of the adjustment device and, in a clamping state, the clamping device rigidly connects the connection section and the slider in the drive direction and thereby allows a rotational relative movement about a rotational axis, which runs along the drive direction, between the driven element and the slider.

3. The adjustment device according to claim 2,
   wherein the connection section projects into a recess of the slider;
   wherein the clamping device is formed in or on the slider;
   wherein, in the release state, the clamping device allows a movement clearance of the connection section in the recess of the slider;
   wherein, in the operational state of the adjustment device, the clamping device presses the connection section against a contact surface of the recess of the slider facing the clamping device and thereby rigidly couples the slider to the driven element in the drive direction, wherein a rotational relative movement about a rotational axis, which runs along the drive direction, between the driven element and the slider.

4. The adjustment device according to claim 3, wherein the connection section comprises at least one resilient portion.

5. The adjustment device according to claim 4, characterized in that the spring-elastic portion is formed integrally with the connection section.

6. The adjustment device according to claim 2, wherein the connection section comprises a first support section on the side facing the clamping device, wherein a respective support element is mounted in the first support section and wherein, in the clamping state, the clamping device presses the support element against the connection section and thereby permits a relative rotation between the respective support element and the clamping device.

7. The adjustment device according to claim 2, wherein the connection section of the slider comprises a second support section on the side facing away from the clamping device, wherein a respective support element is supported in the second support section, and wherein, in the clamping state, the clamping device presses the connection section against the second support element and the latter presses against the contact surface of the recess and thereby permits a relative rotation between the respective support element and the connection section of the slider.

8. The adjustment device according to claim 6, wherein the respective one of the support elements is designed as a support element which is spherically shaped at least in a section.

9. The adjustment device according to claim 6, wherein the respective support section is designed in such a way that it acts in a self-centering manner with respect to the spherically shaped section of the support element.

10. The adjustment device according to claim 2, wherein the connection section comprises two spring-elastic sections arranged opposite and spaced apart from one another and wherein a clamping element is arranged in an intermediate space of the connection section located between the two spring-elastic sections, against which clamping element the two spring-elastic sections are prestressed by means of the support elements so that, in the operational state of the adjustment device, the clamping device presses the spring-elastic sections with the clamping element against the contact surface of the recess of the slider and thereby rigidly couples the slider to the driven element in the drive direction.

11. The adjustment device according to claim 10, wherein the material of the clamping element comprises a coefficient of thermal expansion that is different from the material of the connection element.

12. The adjustment device according to claim 2, wherein the base section is attached to the driven element or to the slider, wherein the clamping device acts between the base section and the connection section, wherein, in the release state, the clamping device allows clearance between the base section and the connection section, and in the clamping state, the connection section protrudes from the base section against a mounting part of the slider and the latter presses against the driven element.

13. The adjustment device according to claim 12, wherein the base section and the connection section are resiliently mounted to each other in the drive direction.

14. The adjustment device according to claim 12, wherein the base section and the connection section form a solid-state body assembly comprising a solid-state hinge located between the base section and the connection section.

15. The adjustment device according to claim 12, wherein a first support element is situated between the mounting part of the slider and the connection section, and wherein a second support element is situated between the mounting part of the slider and the driven element, so that, in the clamping state, the support elements form a pivot joint for providing the rotational relative movement about an axis of rotation between the driven element and the slider extending along the drive direction.

16. The adjustment device according to claim 12, wherein the respective support elements are each designed as a support element which is spherically shaped at least in a section.

17. The adjustment device according to claim 12, wherein the mounting part of the slider comprises a first support section on the side facing the clamping device, wherein a respective support element is mounted in the first support section, and wherein in the clamping state the clamping device presses the first support element against the mounting part and thereby allows a relative rotation between the respective support element and the clamping device.

18. The adjustment device according to claim 12, wherein the mounting part of the slider comprises a second support section on the side facing away from the clamping device, wherein a respective support element is mounted in the second support section, and wherein, in the clamping state, the clamping device presses the mounting part against the second support element and the latter presses against the driven element and thereby allows a relative rotation between the respective support element and the mounting part.

19. The adjustment device according to claim 17, wherein the respective support section is shaped in such a way that it acts in a self-centering manner with respect to the spherically shaped section of the support element.

20. The adjustment device according to claim 1, wherein the stator, together with the driven element, forms a cavity within which the drive device is arranged.

21. The adjustment device according to claim 1, wherein the drive device comprises an electromechanical element.

22. The adjustment device according to claim 1, wherein the support device is formed by a drive device, wherein the slider is situated between two drive devices arranged opposite one another.

23. An adjustment device which comprises a stator, a driven element, a guide device which, in the operational state of the adjustment device, provides a guided support of the driven element with respect to the stator in a drive direction, a rotor which executes a rotation or a rotation as an adjustment movement, a support device which movably supports the rotor relative to the stator along the drive direction, a drive device comprising a coupling device and a clamping device;
 wherein the coupling device comprises a connection device which is fastened to the driven element or the rotor;
 wherein, in a release state, the clamping device permits a movement clearance between a connection section of the connection device and either the rotor or the driven element in order to establish a mounting state of the adjustment device and wherein, in a clamping state, the clamping device rigidly couples the connection section and either the rotor or the driven element in the drive direction, thereby causing a rotational relative movement about a rotational axis, which runs along the drive direction, between the driven element and the rotor.

24. A method for assembly of an adjustment device according to claim 1 or 23, characterized by the steps of:
 mounting the support device and the guide device to the stator;
 connecting a slider or the rotor to the support device;
 mutual alignment of the slider or the rotor and the drive device;
 mounting the drive device to the stator;
 mounting the driven element to the guide device; connecting the driven element to the slider or the rotor by means of the coupling device.

* * * * *